United States Patent
Mori et al.

(10) Patent No.: US 10,498,251 B2
(45) Date of Patent: Dec. 3, 2019

(54) POWER CONVERTER

(71) Applicants: Mitsubishi Electric Corporation, Chiyoda-ku (JP); TOSHIBA MITSUBISHI-ELECTRIC INDUSTRIAL SYSTEMS CORPORATION, Chuo-ku (JP)

(72) Inventors: Osamu Mori, Chiyoda-ku (JP); Toshiyuki Fujii, Chiyoda-ku (JP); Kaho Mukunoki, Chiyoda-ku (JP); Ryosuke Uda, Chiyoda-ku (JP); Taichiro Tsuchiya, Chuo-ku (JP); Akihiro Matsuda, Chuo-ku (JP); Hisanori Taguchi, Chuo-ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/769,111

(22) PCT Filed: Oct. 31, 2016

(86) PCT No.: PCT/JP2016/082322
§ 371 (c)(1),
(2) Date: Apr. 18, 2018

(87) PCT Pub. No.: WO2017/077983
PCT Pub. Date: May 11, 2017

(65) Prior Publication Data
US 2018/0302003 A1 Oct. 18, 2018

(30) Foreign Application Priority Data
Nov. 4, 2015 (JP) ................................. 2015-216315

(51) Int. Cl.
*H02M 7/162* (2006.01)
*H02M 1/084* (2006.01)
(Continued)

(52) U.S. Cl.
CPC ......... *H02M 7/1623* (2013.01); *H02M 1/084* (2013.01); *H02M 7/1557* (2013.01);
(Continued)

(58) Field of Classification Search
CPC .... H02M 7/1623; H02M 7/1557; H02M 7/17; H02M 7/219; H02M 1/084; H02M 2001/0006; H02M 2007/4835
See application file for complete search history.

(56) References Cited

U.S. PATENT DOCUMENTS
2014/0313797 A1 10/2014 Davidson et al.

FOREIGN PATENT DOCUMENTS
EP 2549634 A1 1/2013
JP 5378274 B2 12/2013
WO WO 2013/071957 A1 5/2013

OTHER PUBLICATIONS
Zhou et al., Jul. 2014, IEEE Trans. on Power Electronics, vol. 29, 3267-3278.*
(Continued)

*Primary Examiner* — Jue Zhang
(74) *Attorney, Agent, or Firm* — Oblon, McClelland, Maier & Neustadt, L.L.P.

(57) ABSTRACT

Since a power converter including a modular multilevel converter uses a large number of cells each combining a plurality of switching elements and a DC capacitor, there is a problem of conduction loss due to the switching elements. The conduction loss is reduced by connecting a bypass circuit between terminals of each of the cells, controlling to open and close the switching element, and controlling to (Continued)

short-circuit the bypass circuit connected to the cell controlled to output zero voltage.

5 Claims, 7 Drawing Sheets

(51) Int. Cl.
  *H02M 7/155* (2006.01)
  *H02M 7/17* (2006.01)
  *H02M 7/219* (2006.01)
  *H02M 1/00* (2006.01)
(52) U.S. Cl.
  CPC .............. *H02M 7/17* (2013.01); *H02M 7/219* (2013.01); *H02M 2001/0006* (2013.01)

(56) References Cited

OTHER PUBLICATIONS

Ahmed et al., Oct. 29, 2014-Nov. 1, 2014, IEEE IECON 2014, 4676-4682.*
International Search Report dated Jan. 10, 2017 in PCT/JP2016/082322, filed on Oct. 31, 2016.
Extended European Search Report dated Oct. 15, 2018 in European Patent Application No. 16862043.3, 7 pages.

* cited by examiner

FIG. 4A

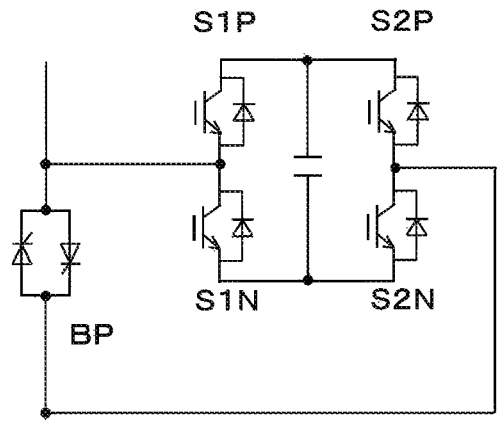

FIG. 4B

|  | S1P | S1N | S2P | S2N | BP | output voltage of converter cell |
|---|---|---|---|---|---|---|
| mode 1 | OFF | OFF | OFF | OFF | ON | zero voltage output |
| mode 2 | ON | OFF | OFF | ON | OFF | capacitor voltage (+) output |
| mode 3 | OFF | ON | ON | OFF | OFF | capacitor voltage (−) output |

FIG. 4C

|  | S1P | S1N | S2P | S2N | BP | output voltage of converter cell |
|---|---|---|---|---|---|---|
| mode 1 | ON | OFF | ON | OFF | OFF | zero voltage output |
| mode 2 | ON | OFF | OFF | ON | OFF | capacitor voltage (+) output |
| mode 3 | OFF | ON | ON | OFF | OFF | capacitor voltage (−) output |

POWER CONVERTER

TECHNICAL FIELD

The present invention relates to a power converter, and more particularly to a power converter including a modular multilevel converter in which a plurality of identical element circuits called cells is connected to each other.

BACKGROUND ART

A modular multilevel converter (hereinafter referred to as an MMC) is formed by connecting a plurality of cells each including a switching element, capable of on-off control and a DC capacitor to constitute an arm, and each cell in the arm outputs voltage pulses of different phases to synthesize a multilevel waveform with less harmonics as the whole arm. In this MMC, since a capacitor voltage in each cell can be evenly divided by control, it is possible to increase the voltage by adding cells, so that application to a large capacity power system converter is being advanced.

In this MMC, it is proposed to provide a bypass circuit in parallel to the cell so that operation can be continued even when the cell fails. A bypass circuit is provided for each cell, and when the cell fails, the failed cell is specified and a bypass circuit, provided in the cell is short-circuited so that the failed cell is not involved in the output. The MMC using a short-circuit switch as the bypass circuit is proposed, for example, in Patent Document. 1.

CITATION LIST

Patent Literature

Patent Document 1: Japanese Patent No. 5,378,274

SUMMARY OF THE INVENTION

Technical Problem

Since the MMC can use a low voltage high speed switching element, it is possible to reduce loss and increase frequency of the switching element alone. Further, each arm is made of a cascade connection of cells combining a plurality of switching elements and a DC capacitor, and it is possible to easily increase a withstand voltage of the circuit by increasing the number of cells in a cascade connection, and thus a large number of cells are used. However, when the number of switching element used increases, there is a problem of conduction loss due to the switching elements.

An object of the present, invention is to provide a power converter in which conduction loss caused by a switching element is reduced by focusing on conduction loss due to the switching element, used in the MMC.

Means for Solving the Problems

The present invention is a power converter including a modular multilevel converter in which a plurality of cells each having a switching element is connected to each other, a bypass circuit connected between terminals of the cell, and a controller for controlling to open and close the bypass circuit in synchronization with opening and closing of the switching element of the cell, wherein when the cell outputs zero voltage, a current flowing through the switching element, in the cell flows through the bypass circuit.

Advantage of the Invention

According to the present invention, the conduction loss caused by the current flowing through the switching element in the cell is the conduction loss in the bypass circuit due to the current flowing through the bypass circuit when zero voltage is output, and thus it is possible to reduce the conduction loss due to the switching element in the cell of the modular multi-level converter.

BRIEF DESCRIPTION OF THE DRAWINGS

FIG. 4A is a configuration diagram showing a configuration of a switching element and a bypass circuit of Embodiment 1 of the present invention.

FIG. 4B is an explanatory diagram showing a switching mode using a bypass control of Embodiment 1 of the present invention.

FIG. 4C is an explanatory diagram showing a switching mode using the bypass control of Embodiment 1 of the present invention.

FIG. 6 is a configuration diagram of the cell and the bypass circuit used in Embodiment 1 of the present invention.

MODE FOR CARRYING OUT THE INVENTION

Embodiment 1

Figure 1:
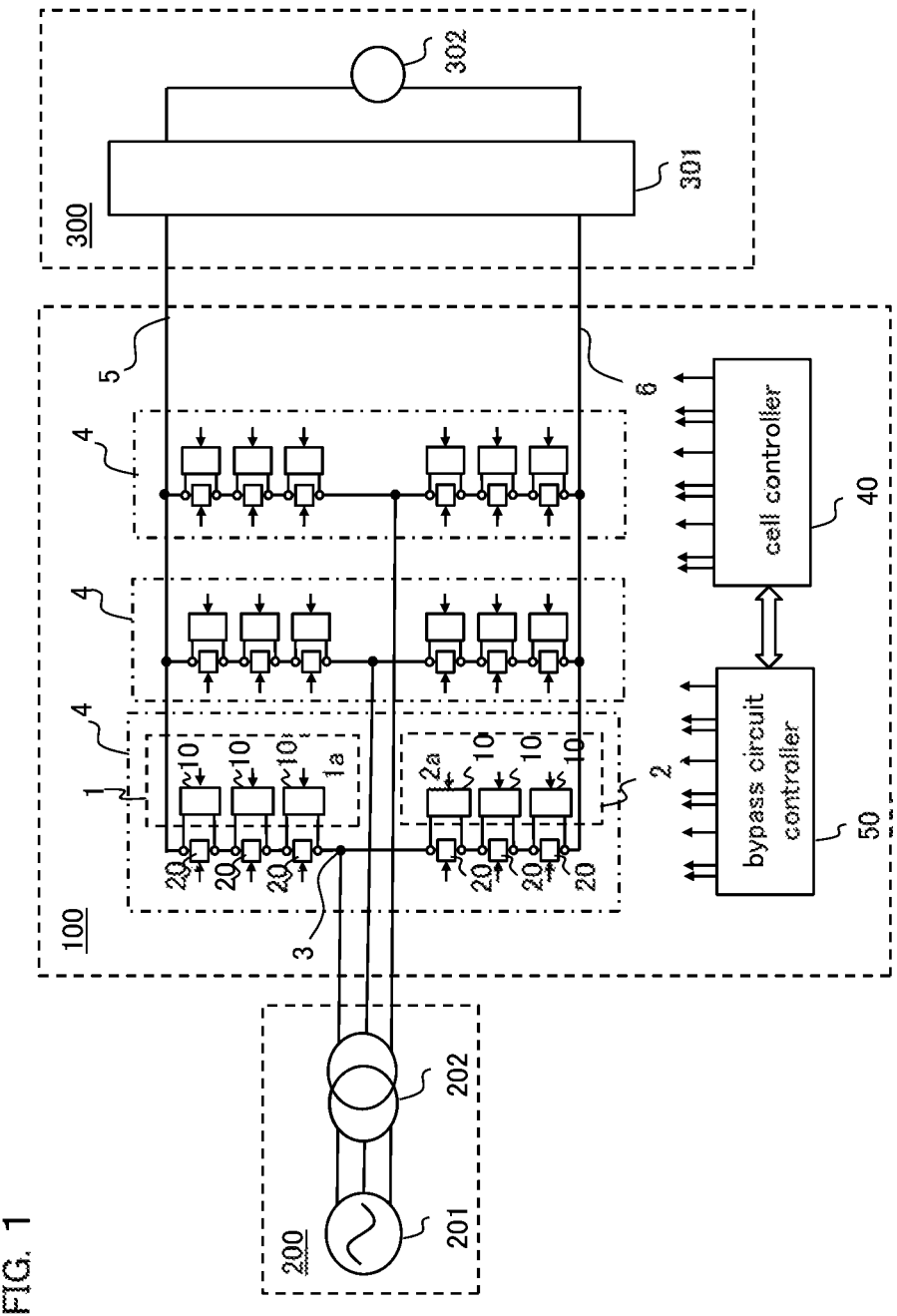
FIG. 1 is a schematic configuration diagram showing an overall configuration of Embodiment 1 of the present invention.

FIG. 1 is a schematic configuration diagram of a power converter for DC power transmission according to Embodiment 1 of the present invention. The power converter 100 is a device for converting power between a three-phase AC input side device 200 and a DC output side device 300. In the input side device 200, an AC power supply 201 is connected to the power converter 100 via an interconnection transformer 202.

Although not shown here, a DC impedance 301 specifically includes a DC cable for transmitting electric power over a long distance, a switchgear for electrically separating the DC cable from the power converter 100, an arrester for suppressing an overvoltage and the like generated in a DC circuit, a DC filter circuit for suppressing harmonics generated in the DC circuit, and the like. Specifically, the DC power supply 302 is connected to the same device as the power converter 100, and is connected to an output terminal on the DC side.

It is to be noted that the input side device 200 and the output side device 300 are shown by way of example, and actually, various modifications such as connecting to the AC power supply 201 via the interconnection reactor instead of the interconnection transformer 202 can be made.

An AC terminal of the power conversion device 100 is composed of three phases, each of which has a positive arm 1 and a negative arm 2 connected in series, and the power conversion device 100 includes three leg circuits 4 in which an AC terminal 3 as a connection point between the positive arm 1 and the negative arm 2 is connected to each phase AC line. The three leg circuits 4 are connected in parallel between a positive DC bus 5 and a negative DC bus 6, and the positive arm 1 of each, leg circuit 4 includes a cell group 1a in which a plurality of cells 10 is connected in series. Further, the negative arm 2 includes a cell group 2a in which the same number of cells 10 as the cells 10 of the positive arm 1 are connected in series. Furthermore, although a reactor is connected in series to the cell group 1a or the cell group 2a, a connection position of the reactor is arbitrary and is omitted here. That is, it has the above-described MMC configuration.

Although an internal circuit configuration of the cell 10 will be described in detail later, it includes a self-turn-off semiconductor element having a switching function and a DC capacitor, and for example, a cell output voltage is controlled by on/off control of a switching element, using a pulse width modulation control (PWM control, Pulse Width Modulation).

A bypass circuit 20 is provided for each connection terminal to which each cell 10 is connected in series. Switching timing of the cell 10 is controlled by a cell controller 40. Switching timing of the bypass circuit 20 is controlled by a bypass circuit controller 50.

The bypass circuit 20 used in Embodiment 1 has two functions.

A first, function is to continue operation of the power converter 100 by short-circuiting output of the cell 10 when the cell 10 is in an abnormal state due to a failure, and to protect the cell 10 so that an excessive current does not flow through the cell 10 when a failure of power system occurs.

A second function is to switch path of current flowing through the cell 10 by opening/closing the bypass circuit in synchronization with switching operation when the cell 10 is in zero voltage output mode out of operation modes of the cell 10, that is, when the cell 10 is in a normal state.

The first function is a function conventionally included in the bypass circuit 20, and is not particular but is also described in Patent Document 1 shown as a prior art document, which is needless to describe.

The second function is a function according to the present invention and is controlled by the bypass circuit controller 50 so as to be linked with the control of the switching element in the cell 10 by the cell controller 40.

Figure 2:
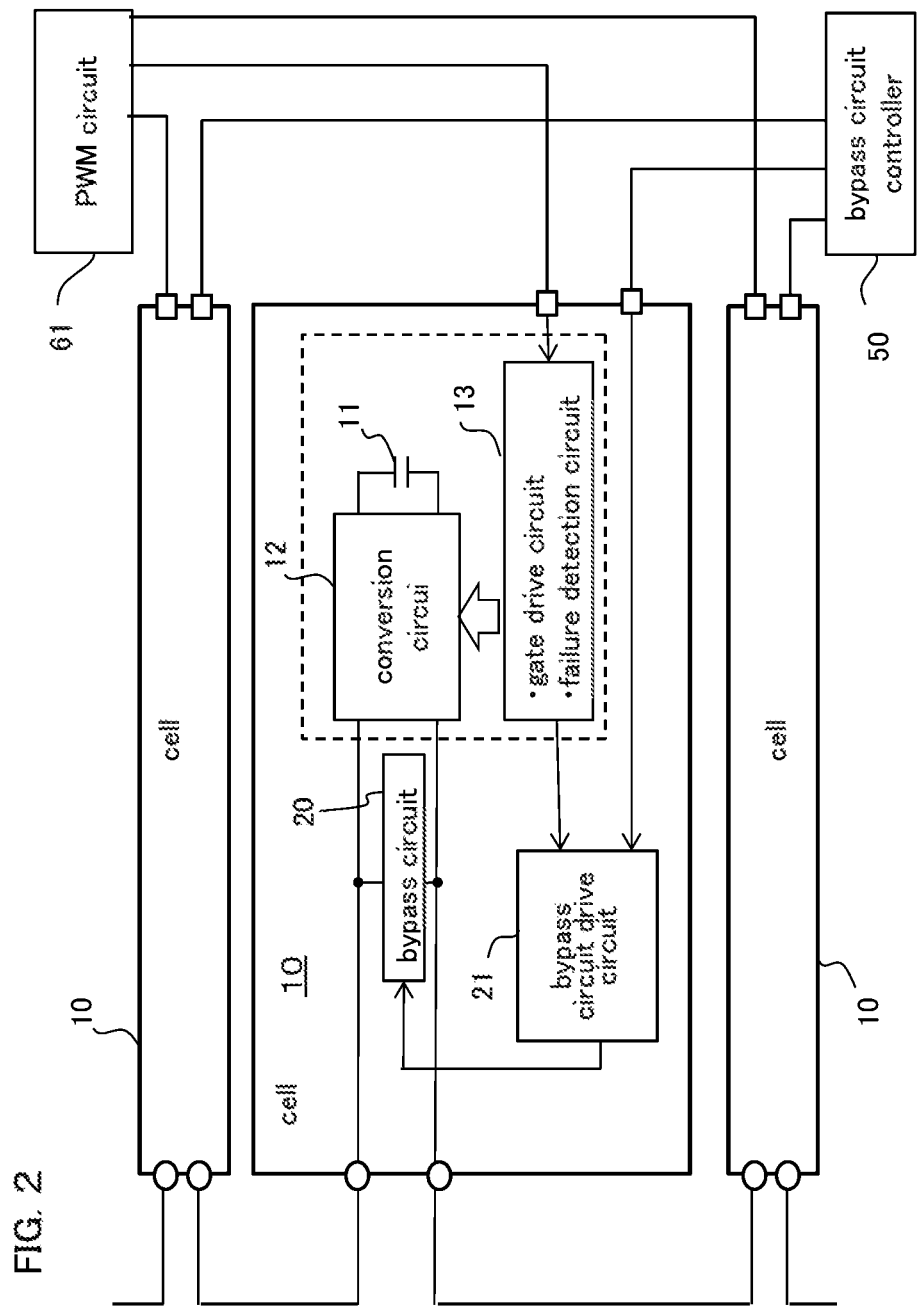
FIG. 2 is a schematic diagram showing a configuration of a cell and a bypass circuit of Embodiment 1 of the present invention.

The cell 10 and the bypass circuit 20 are configured as shown in FIG. 2.

The cell 10 includes a conversion circuit 12 to which a cell capacitor 11 is connected and the bypass circuit 20 connected to an output terminal of the conversion circuit 12. The conversion circuit 12 turns on or off the switching element in the conversion circuit by a gate drive circuit 13 based on a gate drive signal output, from a PWM circuit 61. Further, when a failure occurs in the switching element in the conversion circuit 12, the DC capacitor and a peripheral circuit, and the cell 10 cannot operate normally, it is detected by a failure detection circuit, and the gate drive circuit 13 sends a failure detection signal to a bypass circuit drive circuit 21.

Further, the bypass circuit 20 is also controlled by the bypass circuit, controller 50, and is driven by the bypass circuit controller 50 except when a failure occurs. As described above, the bypass circuit 20 is included in all the cells 10 constituting the power converter, and when the conversion circuit 12 in the cell 10 fails for some reason, the bypass circuit 20 can bypass only the failure cell 10 independently, and thus it is possible to continue operation as a DC power transmission device without stopping an entire power converter. Further, the bypass circuit drive circuit 21 can be operated by the bypass circuit controller 50 even when a failure does not occur.

Although the PWM circuit 61 and the bypass circuit controller 50 are configured to distribute and send signals to each cell from a common circuit rather than in each cell 10, the PWM circuit 61 and the bypass circuit controller 50 may be distributed individually in the cell 10.

Figure 3:
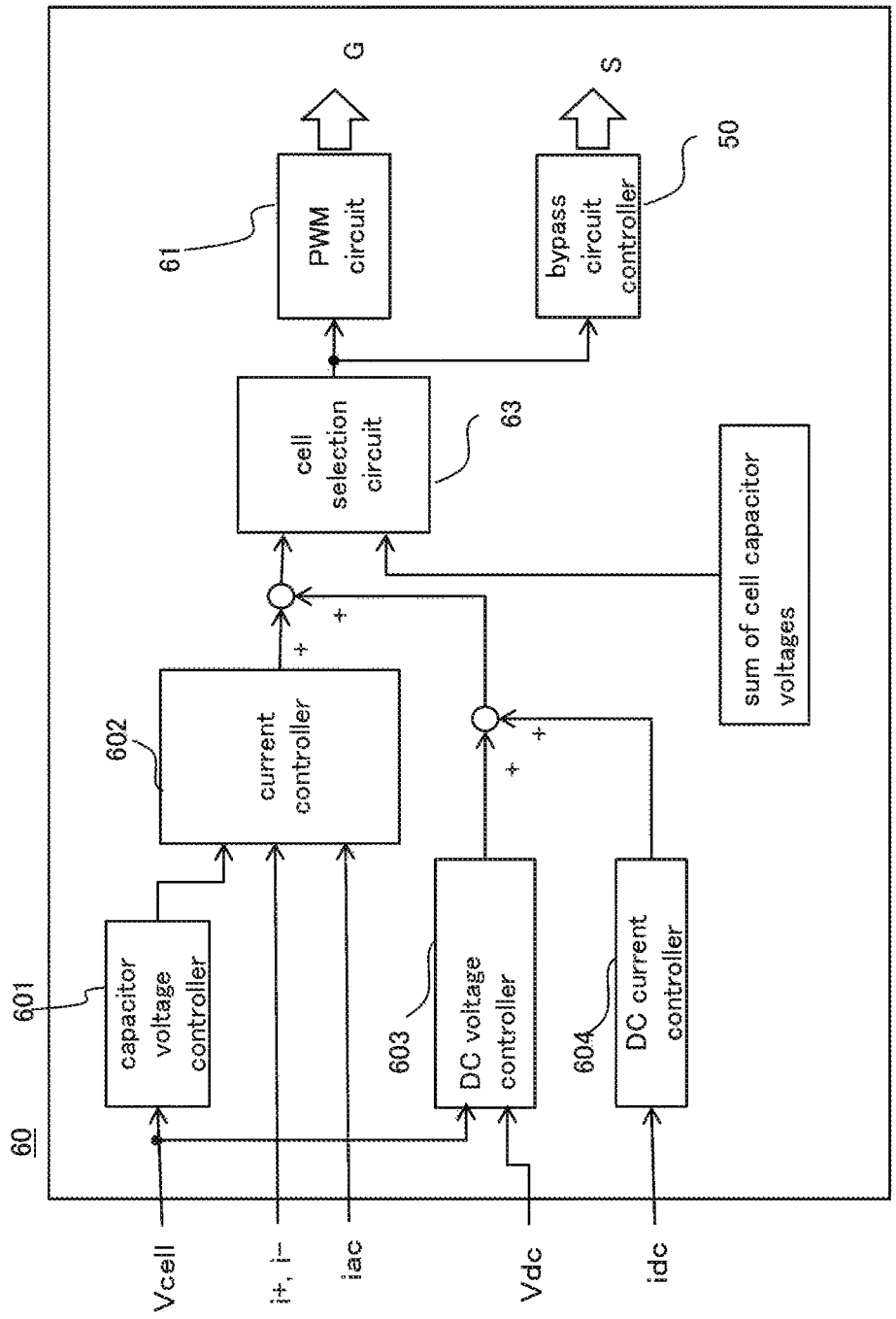
FIG. 3 is a block diagram of a controller of Embodiment 1 of the present invention.

Next, a block diagram of a controller 60 having functions of the cell controller 40 and the bypass circuit controller 50 is shown in FIG. 3.

The block diagram of FIG. 3 shows a system in which the controller 60 outputs a gate signal applied to each cell 10 of the positive arm 1 and the negative arm 2 of the MMC and a drive signal applied to the bypass circuit 20 included in each cell 10.

First, a capacitor voltage controller 601 gives a current command value to a current controller 602 so as to control a capacitor voltage of each cell 10 to be constant. Specifically, in response to an in-arm capacitor voltage Vcell, iacref which is a command value of a current flowing through the AC terminal, i+ref which is a command value of a current flowing through the positive arm 1, and i−ref which is a command value of a current flowing through the negative arm 2 are input to the current controller 602 as current command values. The current controller 602 generates arm voltage command values Vpcc+, Vpcc− respectively for a positive arm current i+, a negative arm current i−, and an AC current iac based on input sensor information.

Further, in order to control the capacitor voltage to be constant, a DC voltage controller 603 receives the in-arm capacitor voltage Vcell and a capacitor voltage command value Vdc, and a DC current controller 604 receives a DC current idc, so that an output of the DC voltage controller 603 and an output of the DC current controller 604 for controlling the DC current to be constant are added together to obtain a DC voltage command value. The DC voltage command value and the voltage command values Vpcc+, Vpcc− of each arm are added to generate the voltage command value Vpc+ of the positive arm and the voltage command value Vpc− of the negative arm.

When the commanded voltage value is lower than a sum T of voltage values of the cell capacitors 11 of the cells 10 constituting the positive arm 1 and the negative arm 2, since it is not necessary to generate voltages from all the cells 10, some of the cells 10 are selected by a cell selection circuit 63 so that, the output is set as zero voltage. Simultaneously with an output of a gate signal G to the selected cell 10, the controller 60 outputs a drive signal S to the bypass circuit 20 from the bypass circuit controller 50.

That is, the controller 60 outputs the gate signal to each of the cells 10 constituting the positive arm 1 and the negative arm 2 based on information on the voltage and the current commanded to the power converter 100. This gate signal is a signal generated by the PWM control in the PWM circuit 61 based on individual voltage command values (V+, V−) of each cell 10.

Next, an operation mode of the cell 10 and the bypass circuit 20 including the switching element and the cell capacitor will be described with reference to the drawings.

FIG. 4A shows a configuration of the switching elements (S1P, S1N, S2P, S2N) of the cell 10 and the switching element (BP) of the bypass circuit 20. Further, FIG. 4B shows ON/OFF states of the switching elements (S1P, S1N, S2P, S2N) of the cell 10 and the switching element (BP) of the bypass circuit 20 in each mode, with a mode of zero voltage output, as mode 1, a case of outputting a plus capacitor voltage as mode 2, and a case of outputting minus capacitor voltage as mode 3. Further, as a comparative example, FIG. 4C shows ON/OFF states of the switching elements (S1P, S1N, S2P, S2N) of the cell 10 and the switching element (BP) of the bypass circuit 20 in each mode, when the switching element BP of the bypass circuit 20 is not used.

As shown in FIG. 4A, in zero voltage output of mode 1, by turning on the switching element BP of the bypass circuit 20 and passing the current to the bypass circuit 20, the number of switching elements through which the current passes decreases, so that conduction loss can be reduced. In contrast, when the switching element of the bypass circuit 20 is not used for each mode, the conduction loss occurs since the current passes through the conversion circuit 12 of the cell 10.

That is, when the cell 10 is healthy (in normal operation), it has a control mode for opening and closing the bypass circuit 20, so that the conduction loss is reduced.

The switching element constituting the cell shown in FIG. 4A is made of a self-turn-off semiconductor switching element such as a plurality of IGBTs (Insulated Gate Bipolar Transistors) having diodes connected in anti-parallel. In addition to the IGBT, the self-turn-off semiconductor switching element may be a GCT (Gate Commutated Turn-Off Thyristor), a GTO (Gate Turn-Off Thyristor), a transistor, a MOSFET (Metal-Oxide-Semiconductor Field-Effect Transistor), or even a thyristor or the like having no self-turn-off function but capable of forced commutation operation. Further, a plurality of semiconductor elements may be connected in parallel depending on current capacity of the semiconductor element, or a plurality of semiconductor elements may be connected in series depending on voltage withstand capability.

It is preferable for a power conversion device to use a semiconductor element having a small conduction loss as the switching element constituting the bypass circuit.

Next, the state of the cell 10 when generating a sinusoidal voltage by controlling the bypass circuit 20 so as to short-circuit the bypass circuit 20 connected to the cell 10 controlled to zero voltage output is shown.

Figure 5:
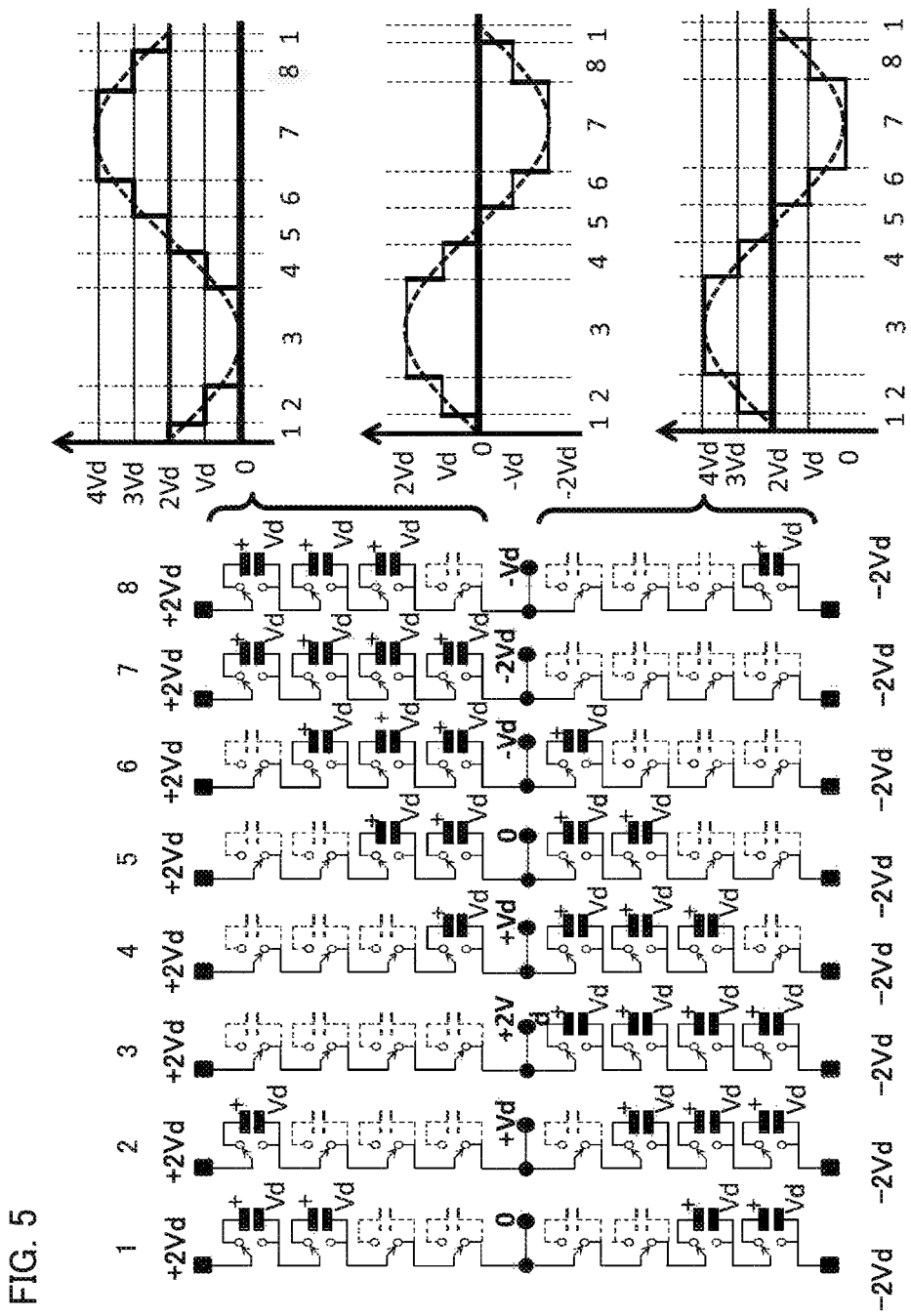
FIG. 5 is a schematic diagram showing a short circuit state of a bypass circuit 20 when generating a sinusoidal voltage.

FIG. 5 is a schematic: diagram showing a short circuit-state of the bypass circuit 20 when generating a sinusoidal voltage, wherein an upper right waveform diagram of FIG. 5 shows a positive arm voltage, a middle waveform diagram shows an AC output voltage, and a lower waveform diagram shows a negative arm voltage. The waveforms of voltages can be obtained by advancing switching of the cells shown on a left side of FIG. 5. Here, the bypass circuit 20 connected to the cell 10 controlled to zero voltage output among the cells 10 is controlled to be short-circuited. As shown in FIG. 5, a voltage required to output the sinusoidal voltage varies with a time axis, and in accordance with this change, it is possible to select the cell 10 to be zero voltage output and control the bypass circuit 20 to be short-circuited.

Figure 6E:
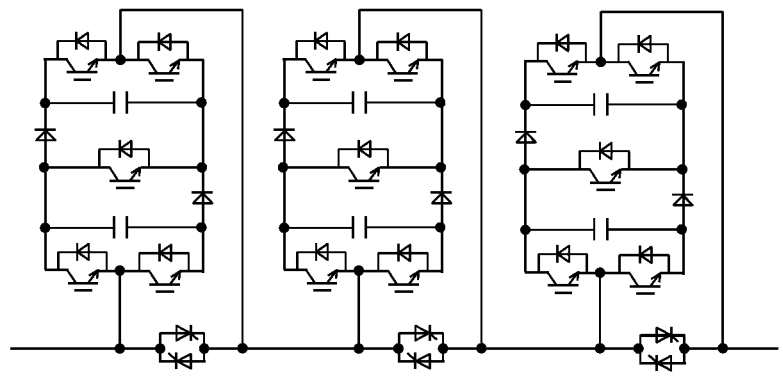
FIG. 6E is a configuration diagram of a further developed cell.

Although the cell 10 is shown as a switching element having a simple configuration in the description above, a large number of switching elements are actually used in the cell 10. As an example of this case, a configuration diagram of a developed form from a basic form of the cell 10 and the bypass circuit used for the MMC is shown. As shown in FIGS. 6A, 6B, 6C, 6D and 6E, in a stage of FIG. 6E shown as a developed form, five switching elements are used in a cell 10, and it is obvious that the conduction loss when the current flows through the switching elements. Therefore, regarding the cell 10 using a large number of switching elements, changing the current flow by controlling the bypass circuit 20 to be short-circuited for the cell 10 to be zero voltage output is effective in reducing the conduction loss.

Figure 6D:
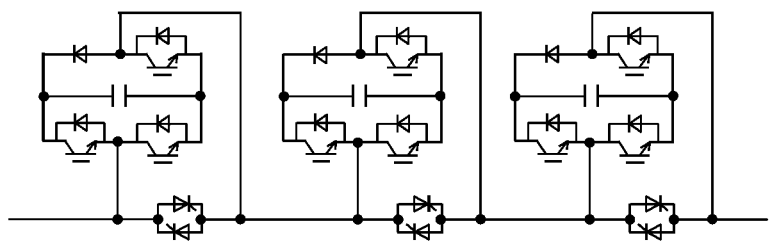
FIGS. 6C and 6D are configuration diagrams of a full bridge cell.
Figure 6C:
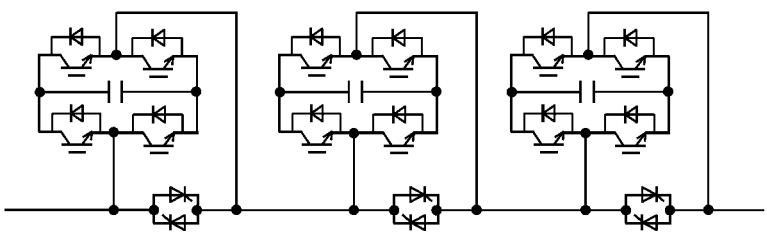
Figure 6B:
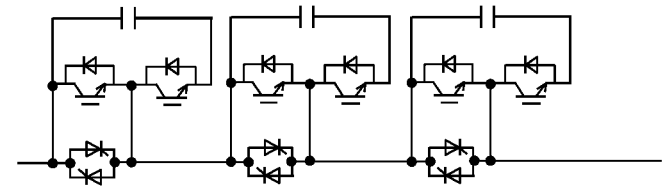
FIGS. 6A and 6B are configuration diagrams of a half bridge cell.
Figure 6A:
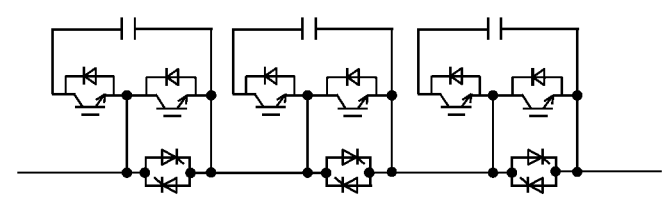

Configuration shown in FIGS. 6A and 6B is a so-called half bridge cell configuration including one leg circuit composed of upper and lower semiconductor elements, and the configuration is differentiated depending on a way of taking out output terminals, but operations are the same. In the half bridge cell, there are two ways of outputting the voltage of the DC capacitor with positive polarity or zero voltage. Configuration shown in FIGS. 6C and 6D is a so-called full bridge cell configuration including two leg circuits, and can also output negative polarity, so that degree of freedom of control is improved.

The configuration shown in FIG. 6E is a configuration example of a cell based on a full bridge cell, and is a configuration capable of further improving the degree of freedom of control by dividing the DC capacitor and providing the switching element and a diode therebetween. Since both configurations are well known, a detailed description will be omitted here.

Embodiment 2

Figure 7:
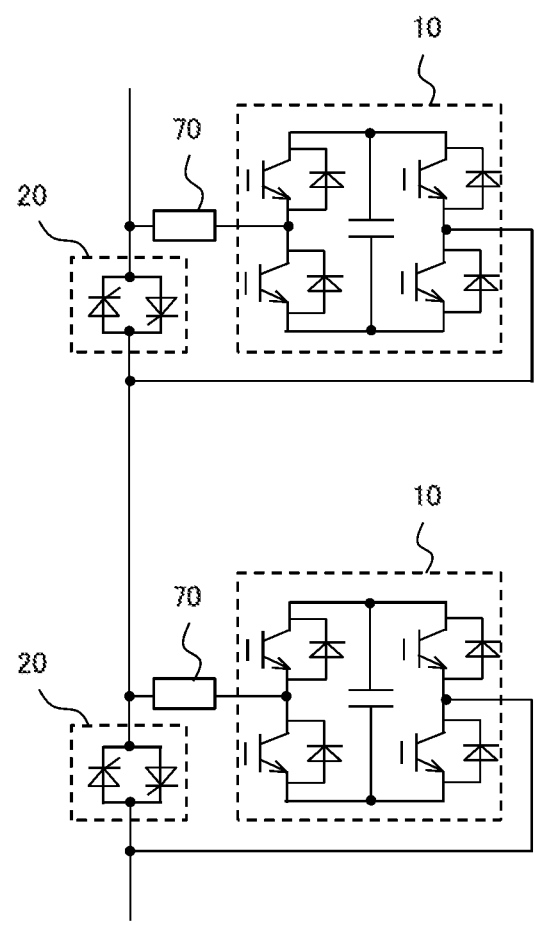
FIG. 7 is a schematic configuration diagram of Embodiment 2 of the present invention.

In Embodiment 1, the conduction loss is reduced by providing a bypass circuit for the cell 10 and controlling the bypass circuit 20 of zero voltage output cell to be short-circuited. In this Embodiment 2, as shown in FIG. 7, a break circuit 70 is provided in each cell 10 of Embodiment 1, and when short-circuiting is performed by the bypass circuit. 20, the cell 10 is electrically disconnected from the positive arm 1 or the negative arm 2 by the break circuit 70 at the same time. In this manner, in addition to effects described in Embodiment 1, since the cell 10 is electrically disconnected, the conduction loss can be completely only the conduction loss of the switching element of the bypass circuit 20.

Note that, within the scope of the invention, the present, invention can freely combine components described in the embodiments, and can arbitrarily modify or omit any component of the embodiment.

The invention claimed is:
1. A power converter comprising:
a modular multilevel converter in which a plurality of cells, each cell having at least one pair of switching elements connected in series and a capacitor connected in parallel to end terminals of the at least one pair of switching elements;
a plurality of bypass circuits respectively corresponding to the plurality of the cells; and
a controller that controls each of the plurality of bypass circuits, wherein the controller controls a bypass circuit based on whether a failure of a cell corresponding to the bypass circuit is detected or not; and wherein
each of the plurality of bypass circuits is connected between terminals of a corresponding cell of the plurality of cells, and
the controller is configured to control the bypass circuit corresponding to a normal cell, in which a failure is not detected, among the plurality of cells, so that the bypass circuit corresponding to the normal cell is opened when the switching element of the nominal cell is in a first state in which voltage of the capacitor of the normal cell is output and the bypass circuit corresponding to the normal cell is closed when the switching element of the normal cell is in a second state in which the voltage of the capacitor of the first cell is not output.

2. The power converter according to claim 1, wherein the bypass circuit comprises a switching element and the switching element of the bypass circuit is made of a semiconductor element.

3. The power converter according to claim 1, wherein a cell of the plurality of cells operates normally when it has zero voltage output.

4. A power converter comprising:
a modular multilevel converter in which a plurality of cells, each cell having at least one pair of switching elements connected in series and a capacitor connected in parallel to end terminals of the at least one pair of switching elements;
a bypass circuit connected between terminals of each of the plurality of cells; and
a controller configured to control opening and closing of the bypass circuit in synchronization with an open/closed state of the switching element of each of the plurality of cells, wherein
each of the plurality of cells comprises a break circuit different than the components of the cell, and the controller is configured to break the break circuit when the bypass circuit is short-circuited.

5. The power converter according to claim 1, wherein the first state includes a positive output state of outputting the voltage of the capacitor as a positive voltage and a negative output state of outputting the voltage of the capacitor as a negative voltage,
the second state includes a zero voltage output state in which a zero voltage is outputted, and wherein
the controller has a first mode for controlling the switching element of the normal cell to the positive voltage output state, a second mode for controlling the switching element of the normal cell to the negative voltage output state, and a third mode for controlling the switching element of the normal cell to the zero voltage output state, and in each of the first mode and the second mode, the bypass circuit corresponding to the normal cell is opened, and in the third mode, the bypass circuit corresponding to the normal cell is closed.

* * * * *